Figure 1:
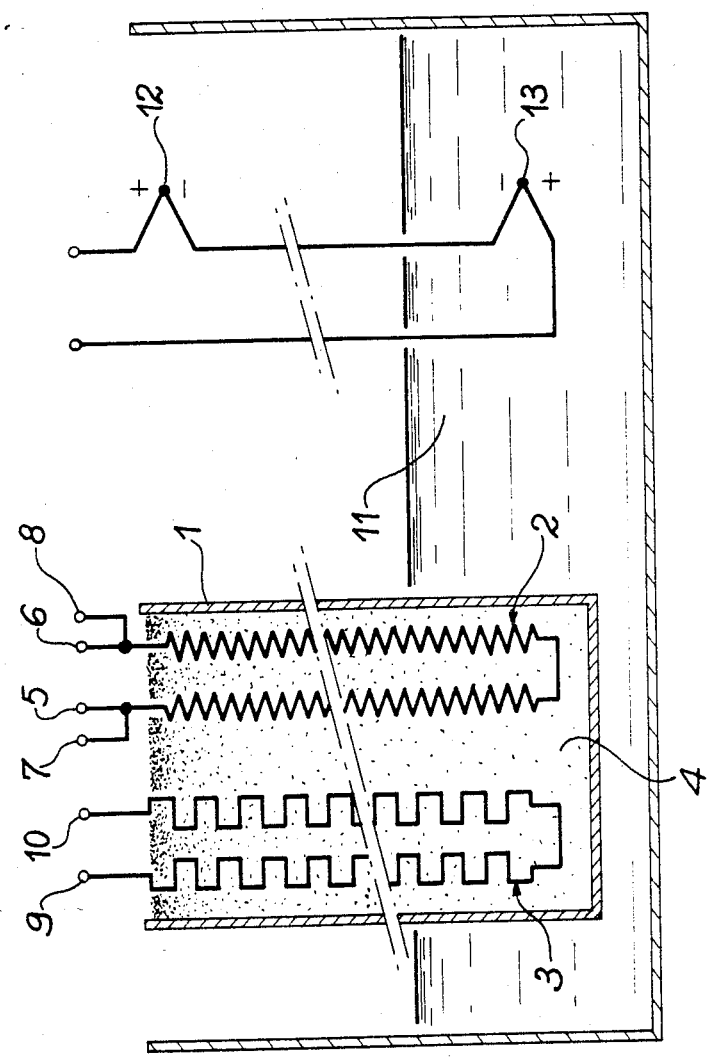

United States Patent [19]

Beaubatie et al.

[11] Patent Number: 4,590,797
[45] Date of Patent: May 27, 1986

[54] THERMAL SYSTEM FOR MEASURING LIQUID LEVELS

[75] Inventors: Jean Beaubatie, Jouy en Josas; Francois Cavarec, Verrieres le Buisson; Jean-François Lenclos, Louveciennes; Marc Paris, Bezons, all of France

[73] Assignees: Commissariat a l'Energie Atomique; Framatome & Cie, both of Paris, France

[21] Appl. No.: 653,454

[22] Filed: Sep. 24, 1984

[30] Foreign Application Priority Data

Sep. 29, 1983 [FR] France .................. 83 15562

[51] Int. Cl.⁴ .................................. G01F 23/22
[52] U.S. Cl. .......................... 73/295; 340/622; 137/392
[58] Field of Search ................. 73/291, 292, 295; 374/54; 340/622; 323/366, 369; 137/392

[56] References Cited

U.S. PATENT DOCUMENTS

| 3,644,885 | 2/1972 | Radin | 340/244 C |
| 3,955,416 | 5/1976 | Waiwood | 73/295 |
| 3,956,760 | 5/1976 | Edwards | 340/244 C |
| 4,125,021 | 11/1978 | Kamei et al. | 73/291 |
| 4,319,233 | 3/1982 | Matsuoka et al. | 73/295 |
| 4,423,629 | 1/1984 | Ara et al. | 73/295 |

FOREIGN PATENT DOCUMENTS

| 2219402 | 9/1974 | France . | |
| 2367276 | 5/1978 | France . | |
| 2401406 | 3/1979 | France . | |
| 0158522 | 9/1982 | Japan | 73/295 |

Primary Examiner—Charles Frankfort
Assistant Examiner—Thomas B. Will
Attorney, Agent, or Firm—James E. Nilles

[57] ABSTRACT

A thermal liquid level measuring system including a heat sensor with a sheathed heating resistor and a measuring resistor. Power is supplied to the heating resistor in a series of pulses. The measuring resistor is connected to two filters which extract the a.c. and d.c. components from the measuring signal. A temperature measuring device determines the difference in temperature of the liquid and the gas above the liquid. A computer receives signals from the filters and the temperature measuring device to determine the level of the liquid and its temperature.

6 Claims, 6 Drawing Figures

THERMAL SYSTEM FOR MEASURING LIQUID LEVELS

The present invention relates to a thermal system for measuring liquid levels. It applies to the measurement of the relative to absolute level of the liquid in containers, such as e.g. steam-generating nuclear boilers.

It more particularly makes it possible to continuously measure this level with a very short response time, even when the latter varies rapidly over distances of several meters, in an environment whose physical conditions are also subject to development (temperature, pressure, single-phase or two-phase state).

In the case of liquid-containing container, it is often necessary to accurately know the liquid level value. These containers can have different shapes and can be made from different materials. In addition, the liquids contained therein can have a random temperature and be under a random pressure. Various types of liquid level measuring sensors are known having floats, twisting tubes, based on differential pressure, capacitive, etc and these are used in per se known manner and are generally suitable in numerous cases of use. The type of sensor to be used is defined as a function of the operating conditions (pressure, temperature, corrosion, etc) and the installation conditions.

However, in the case where the physical quantities vary rapidly, measuring sensors do not always supply the desired rapid, precise response.

In the case of steam-generating nuclear boilers, the measuring equipment and particularly the level measuring sensors must be able to meet the criteria referred to hereinbefore and after any earthquake or a fracture of the primary circuit leading to a loss of the primary fluid. If at the time of a possible fracture, the primary fluid evaporates in the confinement enclosure, it leads to a rise in the pressure and the temperature therein. Safety and security systems lead to the parallel injection of water into the primary circuit and of sprinkling in the enclosure. There is then an increase in the water level in the confinement enclosure, as well as a pressure and temperature rise, accompanied by a rise in the radioactivity. As is known, this radioactivity is prejudicial to the satisfactory operation of the electronic components and in due course can modify the characteristics thereof and those of the water level sensor.

In order to meet the problems referred to hereinbefore, measuring sensors in general and level sensors in particular must satisfy the various qualification criteria defined by standards and regulations in force.

A known solution consists of using resistor-based heat sensors. The operating principle of the latter, which is known per se, is based on measuring the value of a heated variable resistor immersed in the medium. Reference is made hereinafter to two patents which illustrate this procedure.

French Patent Application No. 2,219,402 describes different embodiments of a thermal effect or heat sensor. In this sensor, which comprises a measuring resistor and a sheathed heating resistor, the temperature variation during its immersion in a liquid is used for determining the level.

The heat dissipated by this heating resistor is transmitted by convection to the ambient medium contained in the enclosure. As this convection is greater in the liquid medium than in the gaseous medium, the average temperature in the area around the measuring resistor will decrease as the liquid level increases. As the value of the measuring resistor is a function of its temperature, the determination of this value consequently gives information on the liquid level in the enclosure. This type of sensor offers a good resistance to vibrations and also to intense radiation if the materials also forming the same are correctly chosen.

Unfortunately, in this embodiment of a heat sensor, the liquid level must be kept constant throughout a given period to ensure that the detection system gives reliable information. In more general terms, the system described in the aforementioned patent application requires a relatively long stabilization time to obtain an equilibrium temperature along the measuring probe. Moreover, the heat exchange coefficient between the probe and the measured fluid varies with the inherent temperature of the liquid and with the temperature of the vapours above the liquid. The major disadvantage of this system is consequently the time required for stabilizing the indication of the measured level, which corresponds to the time taken by the system for reaching a stable equilibrium temperature along the sensitive element.

Figure 1A:
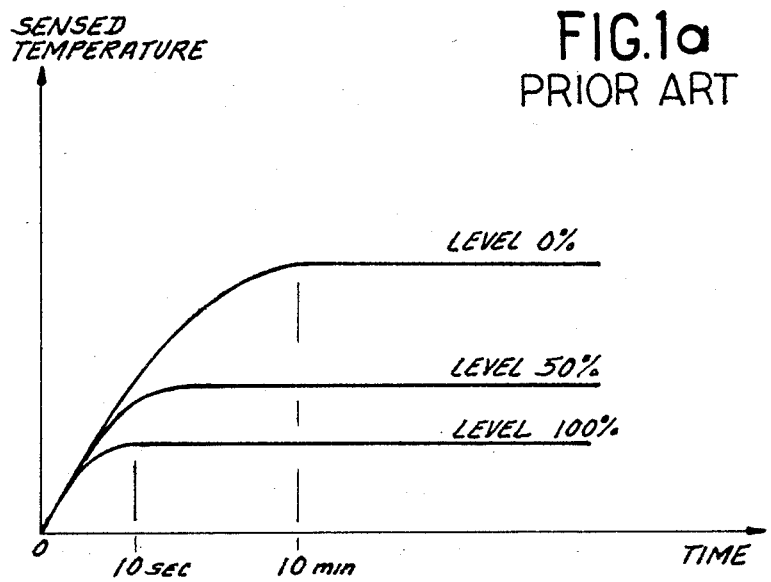

The prior art shown in FIG. 1a shows this phenomenon and it is possible to see three curves relating to temperature variations of the sensitive element on the ordinate as a function of time and on the abscissa for a heating increase of the sensitive elements starting from time t=0 and with a constant liquid level value in said medium.

The curves are experimentally determined and respectively correspond to the values 0%, 50% and 100% of the scale to be measured, i.e. the liquid level in the container. As the measurement of the level is a function of the equilibrium temperature about the sensitive element, it can be seen that a certain heating time for the same is necessary to obtain reliable level value information. The heating time has been experimentally determined at values of approximately 10 seconds for a 100% level and approximately 10 minutes for a zero % level. These values vary as a function of the calorific capacity of the sensitive element, which is dependent on the technology used of the construction thereof.

These operating conditions are prohibitive in numerous cases, particularly for the vessels of water-operated nuclear reactors.

U.S. Pat. No. 3,955,416 describes a liquid level detector making it possible to know whether liquid is or is not present above or below a given level in a container. The probe described in this patent comprises, combined in the same case, a resistor 20 and a thermistor 18 and uses a pulsed heating source in the form of square-wave signals. The oscillator supplying the heating signals also supplies synchronizing signals in phase with the heating signals. Following shaping, these signals control electronic circuits called gates or analog voltage switches. These gates make it possible to sample the value of the measuring signal at a given time and to excite a memory. The values of these signals stored correspond to high and low values of the signal measured at the terminals of the measuring resistor. The shape of these signals is indicated in FIGS. 2b and 2c of said patent. The amplitude difference between curves 2b and 2c makes it possible to establish whether a liquid is absent or present.

If the analog detection system 48, not described in the patent, is appropriately chosen, it is then possible to detect a liquid level threshold without being influenced by temperature variations of the liquid or steam. However, the construction of this type of probe is intended solely for level detection and, in the form indicated in this patent, cannot be adapted to the continuous measurement of a level moving over several meters. It is also stated in this patent (column 5, line 15ff) that it is possible to use a plurality of detectors for monitoring a plurality of level thresholds, which clearly indicates that the inventor does not envisage other solutions for monitoring the displacements of a level to be continuously measured over a long distance.

The object of the present invention is to obviate these disadvantages and in particular to supply a simple thermal system for measuring the level of a liquid which is insensitive to radiation, with which the measured results are obtained in the form of a precise analog signal, independent of ambient temperatures and with a very short response time.

This result is obtained by an original signal processing method, which makes it possible to reliably indicate the value of a liquid level between 0 and 100% scale, The processed signal is measured at the terminals of a resistor, which is variable as a function of the temperature and which is heated. The asembly of the measuring resistor and the heating resistor forming the thermal probe is in principle known and is in accordance with that described e.g. in French Patent Application No. 2,219,402. This probe comprises a wire for the measuring resistor, a wire for the heating resistor, the assembly being surrounded by a metal sheath, which is packed full with alumina powder.

On using such a probe with the detection assembly of ITT U.S. Pat. No. 3,955,416, the results are of an arbitrary nature, because the processing of the signal is solely intended for the detection of a level threshold. If the aforementioned probe is used with a processing of the signal equivalent to that described in French Application No. 2,219,402 using pulsed heating, the result is still uncertain, because the latter is highly dependent on temperature variations on the liquid and gaseous media. Tests make it possible to estimate this inaccuracy as 8% for level indications on a 0 to 100% measuring scale of approximately 500 mm and a temperature variation of approximately 40° C.

In certain cases of use, the ambient temperatures can vary significantly. There is no doubt that the errors introduced by temperature variations are incompatible with an industrial-scale measuring apparatus.

In order to obviate the aforementioned disadvantages, namely either a very long stabilization time before having a reliable level indication, or an important influence of temperature variations on the indication of the measurement, the invention provides a system permitting a precise, rapid measurement.

According to the present invention, the original idea is based on working on the slope of the a.c. component of the measuring signal, which corresponds to a change of state of the control heating signal. This principle leads to making a change of state of the heating signal, at least on each occasion when it is wished to carry out a measurement.

The heating signal can have several different shapes, square, sinusoidal, random etc. For reasons of the simplification of the construction of the processing system and the generator, the heating signal used in the invention is a square signal varying from state 0 to state 48 V d.c. and with a period of a few seconds able to vary as a function of the thermal inertia of the sensitive element.

The invention relates to a thermal system for measuring the liquid level comprising a heat sensor with a measuring resistor and a sheathed heating resistor, in which the temperature variation during its immersion in the liquid is used for determining the said level, characterized in that it comprises a module controlling in pulse-like manner a power amplifier supplying the heating resistor, a matching circuit measuring the voltage at the terminals of the measuring resistor, the latter being supplied by a constant current supply, the output of said circuit being connected in parallel to the inputs of a certain number of filters extracting the d.c. component and a.c. component of the measuring signal, the latter being at the same frequency as the heating supply, a computing module, in which the value of the liquid and its temperature are determined on the basis of output signals of the filters and a signal supplied by the means for measuring the variation of the temperatures of the liquid and gaseous medium above the liquid, said module being designed on the basis of known analog circuits in order to process the liquid level signal on the basis of the first derivative with respect to the time of the a.c. component of the measuring signal.

According to another feature, there can be two filters, namely a first filter extracting the d.c. component of the measuring voltage and a second filter giving at the output a signal proportional to the amplitude of the a.c. component of the measuring voltage in quadrature with the heating control signal, the two filters being controlled by pulse signals produced by the module.

According to another feature, the computing module comprises two computing circuits, whereof the sum of the output signals supplies, on the basis of two output signals of the filters and the signal from the means for measuring the temperature difference of the liquid and the gaseous medium, the time derivatives of the estimates of the liquid level and the liquid temperature, said time derivatives being integrated into two integrators, whose outputs are relooped onto the inputs of said computing circuit in order to iterate the values of the liquid temperature and level in accordance with the method of least squares.

The features of the invention can best be gathered from the following description given in an illustrative and non-limitative manner and with reference to the attached drawings, wherein show:

FIG. 1a the defects of the prior art.

FIG. 1 diagrammatically a heat sensor used in the level measuring system according to the invention.

Figure 2:
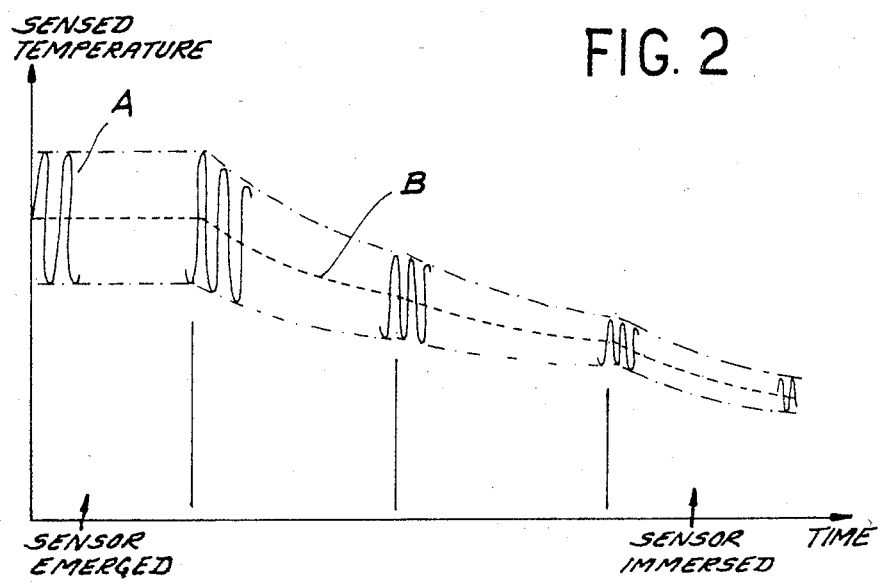

FIG. 2 a graph showing the signal measured by the measuring resistor as a function of time, during a liquid level rise.

Figure 3:
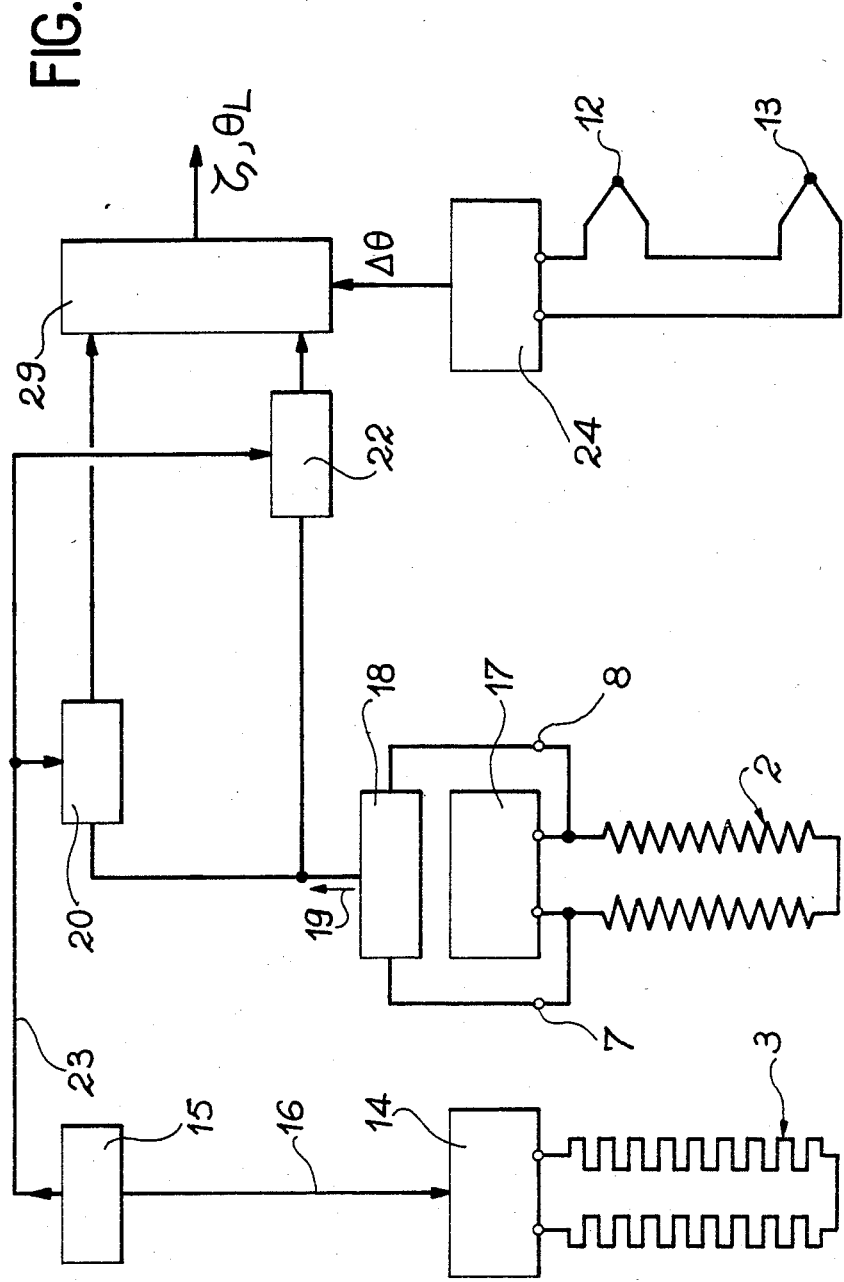

FIG. 3 the operating diagram of the processing circuit for the measured signals.

Figure 4:
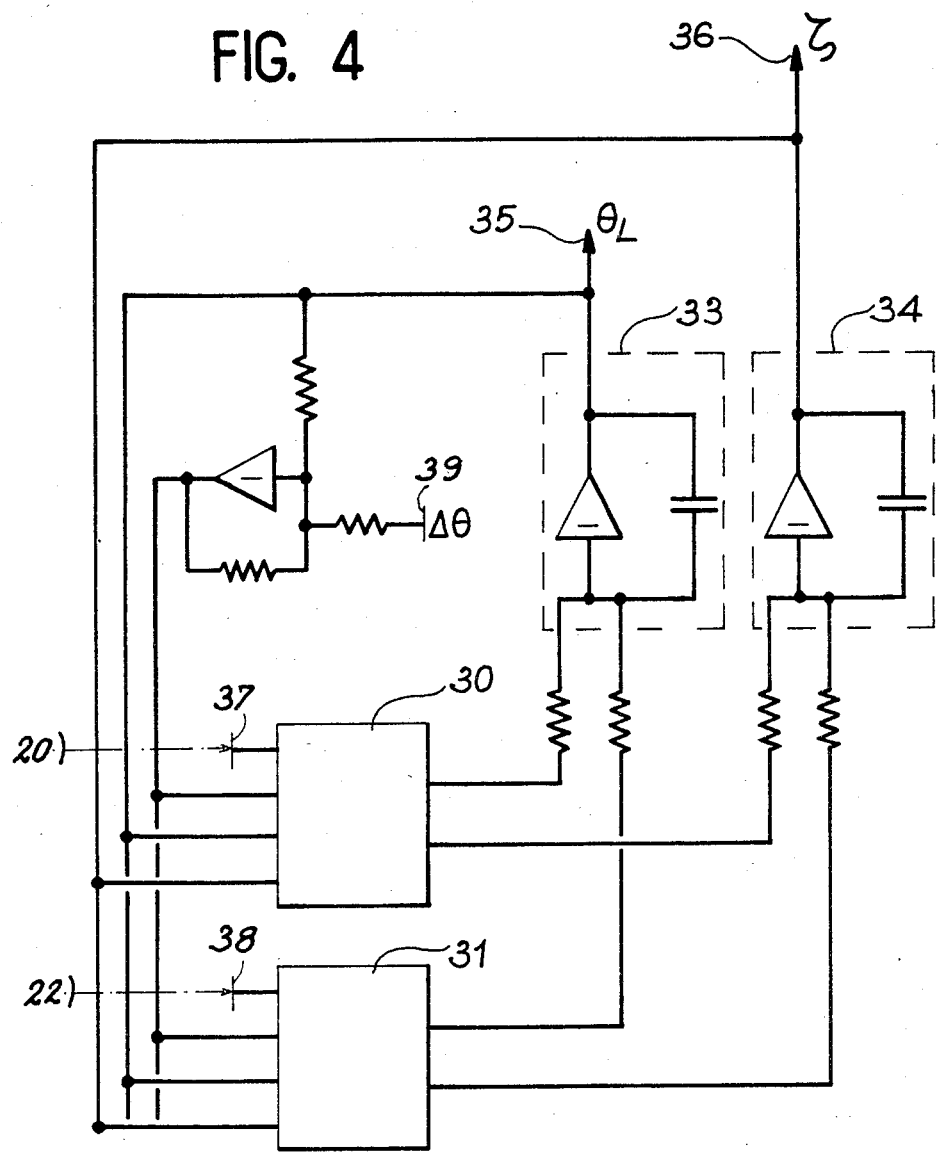

FIG. 4 diagrammatically, the computing module.

Figure 5:
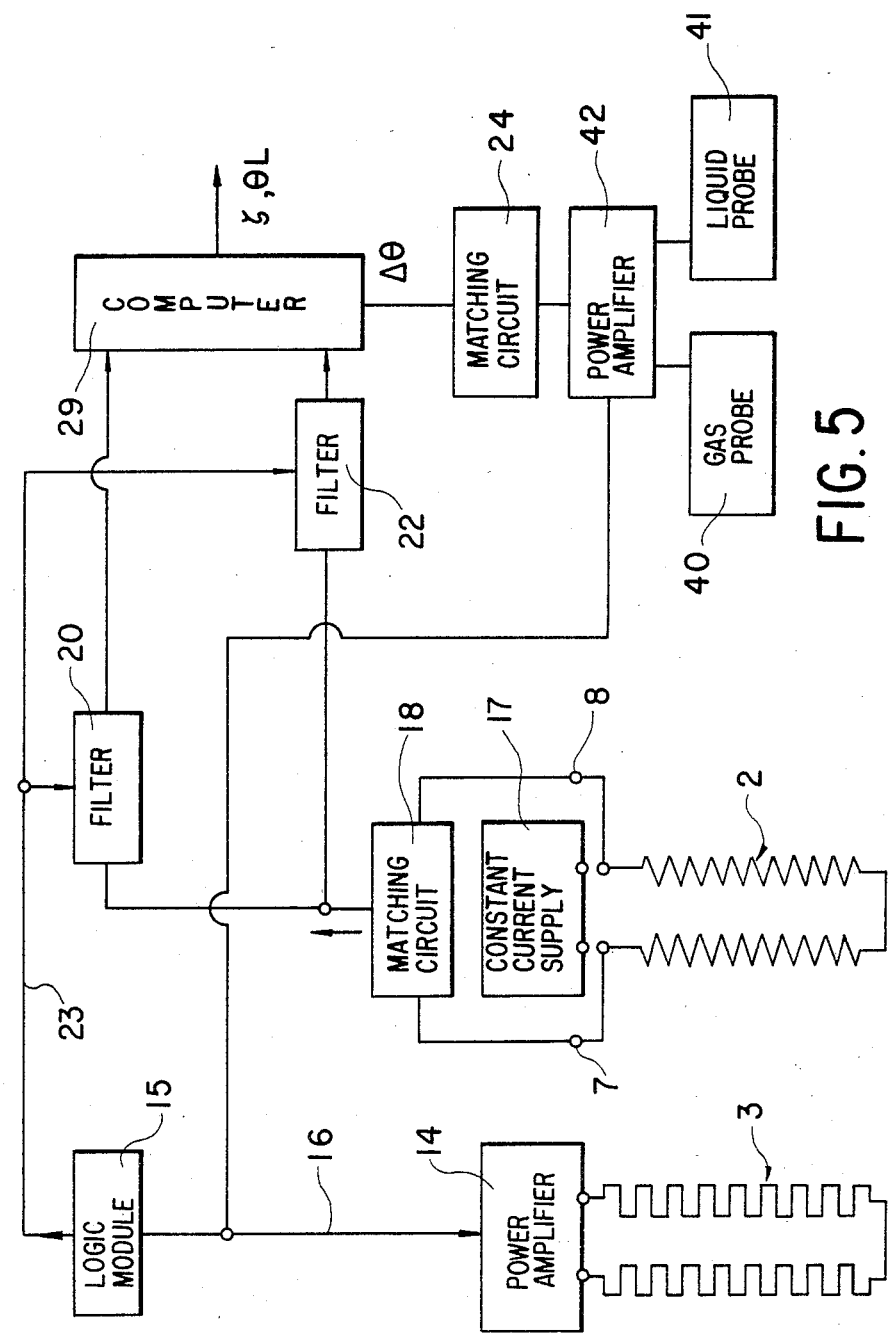

FIG. 5 shows an operating diagram of a second embodiment of the present invention.

FIG. 1 diagrammatically shows a heat sensor used in the liquid level measuring system according to the invention. A preferably stainless steel sheath 1 contains two conductors insulated by an electrical insulant, e.g. alumina powder.

The first conductor represents a measuring thermistor 2, which is supplied by a constant d.c. supply, connected to the terminals 5 and 6. The value of thermistor 2 is a function of the ambient medium temperature. The potential difference at terminals 7 and 8 is used as the measuring signal. The second conductor is a heating resistor 3 supplied by a power amplifier at terminals 9 and 10.

Heating resistor 3 is thermally coupled to the measuring resistor 2 via an insulating material 4, e.g. alumina powder, and the assembly of these two resistors 2 and 3 is in contact with the ambient medium, in which it is wished to measure the liquid level 11.

It is also pointed out that the measuring element shown in solid form in FIG. 1 to facilitate understanding of the drawing is in fact in the form of a cable having a diameter of 1 to 2 mm, having the desired length, often of several meters, so that it can be vertically extended along the complete liquid level measuring scale.

Thus, the mean temperature of the measuring resistor results from the balance between the power supplied by the heating system and that given off to the ambient medium by convection. As convection is greater in the liquid medium than in the gaseous medium, this mean temperature decreases as the liquid level increases. As the resistance value is a function of the temperature, its determination will give information on the liquid level in the ambient medium.

According to an embodiment, the heating and measuring resistors are combined in the same cable formed by a stainless steel sheath. The cable is wound onto a stainless steel support. This assembly is mechanically protected by a cylindrical metal grid.

The use of this sensor makes it necessary to solve two problems, namely the ambient temperature influences the measuring resistor value and consequently prejudices the liquid level determination and the duration of the measurement is relatively long on waiting until the system has reached its equilibrium.

FIG. 2 shows a graph illustrating the signal measured at terminals 7 and 8 of the measuring resistor as a function of time during a liquid—vapour interface rise during which the probe passes from the emergent state into the immersed state.

Use is made of pulsed heating, which can be of a square, sinusoidal, random or other type. The signal of FIG. 2 is the response of sensitive element 2 to the heating pulses of resistor 3, as a function of the liquid level for a constant heating power. The response signal of the sensitive element 2 can be considered as the superimposing of two components. The a.c. component A is at the same frequency as the heating signal. There is little variation in the amplitude of this component with ambient temperature and it consequently mainly depends on the level of the liquid, whose measurement it permits. A component B is the mean value of the preceding signal and is the image of the temperature of the measuring resistor, which itself varies as a function of the level. The electrical signals corresponding to these two components are extracted and calculated by filters 20, 22. The output signals of these filters are then processed by computer 29 in FIG. 3.

The slight dependence of the a.c. component A with respect to the ambient temperature can be compensated by means of component B and the temperature difference $\Delta\theta$ of the liquid medium and the gaseous medium, which is above the liquid, measured by means of two thermocouples 12, 13 in a differential connection, one of them 13 being in the liquid and the other 12 in the gaseous medium (thermocouples 12, 13 are shown in FIG. 1).

It is also possible to use resistance probes for the temperature measurement instead of thermocouples.

The thermal probes can also be resistance probes heated at the same frequency and in phase with the heating signal of the measuring probes. In this case, the temperatures of the liquid and the gaseous medium of the liquid are deduced from the different values of the heat flow in these two media.

For determining the three unknown parameters, the temperature of the liquid $\theta_L$, the temperature of the gas $\theta_V$ and the level of the liquid $\zeta$, there are in fact three measurements (the value of the temperature component B, the value of the a.c. component A and the temperature difference $\Delta\theta$ between the liquid phase and the gaseous phase or the absolute temperatures of these two phases).

The operating diagram of the processing circuit for the measured signals is shown in FIG. 3. The heating resistor 3 is supplied by a power amplifier 14. The frequency of the heating pulses is defined by a logic module 15, which controls the power amplifier 14 with a signal 16.

There is a significant rise in the temperature of the sensitive element (e.g. approximately 100° C.) compared with that of the liquid to be measured. This large temperature variation makes it possible to improve the sensitivity of the complete sensor during transience.

Measuring resistor 2 is supplied by a constant current supply 17. A matching circuit 18 measures the voltage at the terminals 7, 8 of said resistor. This signal is proportional to the a.c. component A shown in FIG. 2. The measured signal 19, i.e. the voltage, is applied to the input of two filters 20, 22. The first filter 20 extracts the d.c. component of the measured signal and is constituted by an integrator and an analog memory. The integrator is controlled by a control signal 23 from module 15. At the output, the second filter 22 gives signals proportional to the amplitude of the a.c. component of the voltage measured in quadrature with the heating signal. It is also controlled by module 15, the control signal being in quadrature with the control signal 16 of the heating system.

Matching circuit 24 establishes the difference between the voltage produced by the two thermocouples 12 and 13 connected in opposition. This difference is converted into a signal which represents the difference in temperature measured by the two thermocouples.

The output signals of filters 20, 22 and the signal supplied by thermocouples 12, 13 are respectively introduced at 37, 38 and 39 into a computing module 29 shown in FIG. 4, which determines the value of the liquid level $\zeta$ and the temperatures $\theta_L$ of the liquid and $\theta_V$ of the gaseous phase. The computer 29 is constructed with the aid of per se known analog circuits, whose choice can be easily made by the Expert and which are consequently not described in detail. This computer 29 is particularly designed for processing a reduced level signal $\zeta$ from the first derivative with respect to the time of the a.c. component A of FIG. 2. This permits a considerable reduction to roughly 1 second, of the response time of the measuring assembly, thereby obviating the major defect of the prior art systems analysed in the introduction to the present text. The signals Si supplied by filters 20, 22 have the following general form:

$$S_i = C_{Li}(\theta_L)\zeta + C_{Vi}(\theta_V)(1-\zeta); \quad (i=0, 1, 2)$$

in which $\zeta = N/H$ is the reduced liquid level, N being the liquid height to be measured, H the measuring interval, $\theta_L$ the temperature of the liquid phase, $\theta_V$ the temperature of the vapour phase ($\theta_V = \theta_V + \Delta\theta$); $C_{Vi}$ and $C_{Li}$ are functions dependent on the frequency and power of the a.c. component (V: vapour, L: liquid, i designates the signal $S_0$, $S_1$, $S_2$ from filters 20, 22). Each of the output signals of filters $S_0$, $S_1$, $S_2$ consequently partly represents the development of the liquid level to be measured.

According to the invention, these equations are solved by the two computing circuits 30, 31 of FIG. 4.

One of the possibilities of solving these equations and which is effectively used in these computing circuits is to minimize the variation $\epsilon_i$ in the sense of least squares:
$$\epsilon_i = C_{Li}(\hat{\theta}_L)\hat{\zeta} + C_{Vi}(\theta_V)(1-\hat{\theta}) - S_i$$

in which $\hat{\theta}_L$ and $\hat{\zeta}$ are values calculated from the preceding measurements.

For the unknowns $\zeta$ and $\theta_L$, this method gives the following development equations:

$$\frac{d\zeta}{dt} = -G \sum_{i=0}^{2} \epsilon_i (C_{Li} - C_{Vi})$$

$$\frac{d\theta_L}{dt} = -G \sum_{i=0}^{2} \epsilon_i \left( \zeta \frac{\partial C_{Li}}{\partial \theta_L} + (1-\zeta) \frac{\partial C_{Vi}}{\partial \theta_V} \right)$$

in which G is a gain adjusted so as to obtain a compromise between the speed and stability of the circuit.

The computing circuits then tend to reduce the variation between the inputs signals and one of these significant level output values.

The outputs of the computing circuit are integrated by integrators 33, 34, whose outputs 35, 36 give the analog signal of the liquid level value $\zeta$ at output 36 and the analog signal of the liquid temperature value $\theta_L$ at output 35.

The analog signal of the vapour phase temperature value can be obtained by forming the difference between the liquid temperature signal and the temperature difference signal supplied by thermocouples 12, 13.

The computing circuits and filters described hereinbefore can be realised by analog and logic operators, or also by digital, wired or programmed means.

FIG. 5 shows another embodiment of the operating diagram of the present invention. In this embodiment, the thermocouples have been replaced by resistance probes 40 and 41 which measure the temperature of the gas and liquid, respectively. A power amplifier 42 receives the heating signal of the measuring probes in order to heat the resistance probes at the same frequency and in phase with the heating signal. The other elements shown in the figure are similar to those shown in FIG. 3.

We claim:

1. A thermal system for measuring a liquid level comprising a heat sensor with a measuring resistor (2) and a sheathed (1) heating resistor (3), said heating resistor receiving a pulsed power input, wherein the temperature variation of said heat sensor during the immersion of said heat sensor in liquid (11) is used for determining said liquid level, characterized in that it comprises a matching circuit (18) measuring the voltage at terminals (7, 8) of the measuring resistor (2), the measuring resistor being supplied by a constant current supply (17), the output of said matching circuit being connected in parallel to an input of each of two filters (20, 22) for respectively extracting a d.c. component and an a.c. component of the measuring signal, the measuring signal being at the same frequency as said pulsed power input, a computing module (29), in which the value of the level of the liquid and its temperature are determined on the basis of output signals from filters (20, 22) and a signal supplied by a means for measuring the variation of the temperatures of the liquid and gaseous medium above the liquid, said computing module (29) producing a liquid level signal on the basis of the first derivative with respect to time of the a.c. component of the measuring signal.

2. Thermal measuring system according to claim 1, characterized in that the two filters (20, 22) are controlled by pulse signals produced by a logic module (15).

3. Thermal measuring system according to claim 1, characterized in that the temperature measuring means are thermocouples.

4. Thermal measuring system according to claim 1, characterized in that the temperature measuring means are resistance probes.

5. Thermal measuring system according to claim 1, characterized in that the temperature measuring means are resistance probes, which are heated at the same frequency and in phase with said pulsed power input.

6. Thermal measuring system according to claim 1, wherein said computing module comprises two computing circuits and two integrators, each of said two computing circuits receiving a first input from the corresponding one of said two filters, a second input receiving said signal supplied by said means for measuring the variation of the temperatures, and third and fourth inputs connected to the outputs of said two integrators, the input to each integrator being the sum of a first output signal from one of the two computing circuits and a second output signal from the other of said two computing circuits, said inputs to said integrators representing the time derivatives of the liquid level and the liquid temperature, said computing module using the method of least squares by iterating the values of the liquid temperature and liquid level.

* * * * *